(12) United States Patent
Gergaud

(10) Patent No.: US 9,650,079 B2
(45) Date of Patent: May 16, 2017

(54) KART CHASSIS WITH INCREASED IMPACT RESISTANCE, AND CORRESPONDING KART

(71) Applicant: SODIKART, Coueron (FR)

(72) Inventor: William Gergaud, Treillieres (FR)

(73) Assignee: SODIKART, Coueron (FR)

( * ) Notice: Subject to any disclaimer, the term of this patent is extended or adjusted under 35 U.S.C. 154(b) by 0 days.

(21) Appl. No.: 14/785,550

(22) PCT Filed: Apr. 17, 2014

(86) PCT No.: PCT/EP2014/057937
§ 371 (c)(1),
(2) Date: Oct. 19, 2015

(87) PCT Pub. No.: WO2014/170451
PCT Pub. Date: Oct. 23, 2014

(65) Prior Publication Data
US 2016/0059896 A1   Mar. 3, 2016

(30) Foreign Application Priority Data

Apr. 17, 2013   (FR) ...................................... 13 53497

(51) Int. Cl.
*B62D 21/06*   (2006.01)
*B62D 21/18*   (2006.01)
(Continued)

(52) U.S. Cl.
CPC ........... *B62D 21/183* (2013.01); *B62D 21/06* (2013.01); *B62D 23/005* (2013.01); *B62D 27/04* (2013.01); *B60Y 2200/114* (2013.01)

(58) Field of Classification Search
CPC .. B62D 21/183; B62D 21/06; B60Y 2200/114
(Continued)

(56) References Cited

U.S. PATENT DOCUMENTS

| 1,913,053 A | * | 6/1933 | Jaeger | .................... B60G 11/36 280/788 |
| 2,050,945 A | * | 8/1936 | Grinham | ................ B62D 21/06 280/788 |

(Continued)

FOREIGN PATENT DOCUMENTS

DE          29618057 U1    12/1996
DE     102007002676 A1     7/2008
(Continued)

OTHER PUBLICATIONS

International Search Report and Written Opinion dated May 15, 2014 for corresponding International Application No. PCT/EP2014/057937, filed Apr. 17, 2014.

(Continued)

*Primary Examiner* — Keith Frisby
(74) *Attorney, Agent, or Firm* — David D. Brush; Westman, Champlin & Koehler, P.A.

(57) ABSTRACT

A kart includes a chassis having a pair of substantially parallel tubular rails extending longitudinally and connected to one another at each end by at least one transverse tubular element. The kart chassis includes, in the front portion thereof, at least two substantially flared-U-shaped tubes positioned facing one another and assembled in the middle portion such as to form an X-shaped structure between the tubular rails, and at least two substantially rectilinear tubes disposed on each side of the X-shaped structure and each having a first end solidly connected to one of the tubular rails and another end solidly connected to a central portion of the X-shaped structure.

10 Claims, 7 Drawing Sheets

(51) Int. Cl.
*B62D 23/00* (2006.01)
*B62D 27/04* (2006.01)

(58) Field of Classification Search
USPC .................................. 280/793, 794, 796, 798
See application file for complete search history.

(56) References Cited

U.S. PATENT DOCUMENTS

| | | | | |
|---|---|---|---|---|
| 2,077,751 | A | * | 4/1937 | Floss .................... B62D 31/006 180/11 |
| 2,088,453 | A | * | 7/1937 | Werdehoff ............. B62D 21/06 280/794 |
| 2,118,257 | A | * | 5/1938 | Maddock ............... B62D 21/06 280/794 |
| 2,155,750 | A | * | 4/1939 | Best ....................... B62D 21/06 180/291 |
| 2,314,603 | A | | 3/1943 | Sorensen et al. |
| 2,389,907 | A | * | 11/1945 | Helmuth ............... B62D 23/005 280/793 |
| D149,830 | S | * | 6/1948 | Nelson .......................... 280/790 |
| 2,646,991 | A | * | 7/1953 | Dangerfield ........... B62D 21/16 280/794 |
| 3,015,496 | A | | 1/1962 | Campbell |
| 3,557,984 | A | | 1/1971 | Rice |
| 3,829,117 | A | | 8/1974 | Park |
| 4,629,023 | A | | 12/1986 | Carpanelli et al. |
| 2007/0187994 | A1 | * | 8/2007 | Yasuhara ............... B62D 21/06 296/203.04 |

FOREIGN PATENT DOCUMENTS

| | | | |
|---|---|---|---|
| FR | 2185996 A5 | 1/1974 | |
| FR | 2246436 A1 | 5/1975 | |
| GB | 439785 A * | 12/1935 | ............. B62D 21/06 |
| JP | S61163066 A | 7/1986 | |
| WO | 0221232 A1 | 3/2002 | |

OTHER PUBLICATIONS

English translation of the International Written Opinion dated Oct. 17, 2015 for corresponding International Application No. PCT/EP2014/057937, filed Apr. 17, 2014.

French Search Report and Written Opinion dated Feb. 21, 2014, for corresponding French Application No. 1353497, tiled Apr. 17, 2013.

* cited by examiner

KART CHASSIS WITH INCREASED IMPACT RESISTANCE, AND CORRESPONDING KART

CROSS-REFERENCE TO RELATED APPLICATIONS

This Application is a Section 371 National Stage Application of International Application No. PCT/EP2014/057937, filed Apr. 17, 2014, the content of which is incorporated herein by reference in its entirety, and published as WO 2014/170451A1 on Oct. 23, 2014, not in English.

1. Field of the Invention

The field of the invention is that of recreational vehicles used for example on tracks. More specifically, the invention relates to the structure and especially the chassis of such vehicles, especially karts.

Karts are motor-driven vehicles used on closed tracks as opposed to road-running vehicles. Such tracks are outdoor or indoor tracks.

Two main categories of karts can be distinguished: rental karts and karts used for leisure and racing.

The former are operated by professionals which rent them out to private individuals (ticket-based rental systems) or to companies for staff motivation seminars or the like.

The latter category comprises karts mostly owned by private individuals who use them for recreation and for practice and taking part in competitions.

The invention applies more particularly to rental karts but also to karts for competition and leisure.

2. Prior Art and Its Drawbacks

Technically, karts have certain special features as compared with other vehicles. Unlike passenger vehicles for which it is accepted that, in case of impact, the deformation energy will lead to the destruction of the structure, karts require that the deformation should be reversible to the greatest possible extent. This condition is necessary especially for rental vehicles to enable continued operation and avert frequent and hence costly changes of parts.

In addition, for purposes of security and protection of the driver, protection elements are also fixedly attached to the chassis in order to absorb the energy of the impact in case of collision, to avoid accidents of straddling and entanglement with other karts or again to prevent contact with the wheels of neighboring karts.

These various protection elements, which are necessary for the driver's safety, transmit to the frame heavy stresses which can lead to breakage or plastic deformation of the tubes forming the chassis, and this can make it necessary to have local reinforcement pieces when the forces are introduced.

This contributes to the stiffening of the chassis and therefore impairs its spin capacity.

Indeed, karts have neither differential nor suspension and therefore their ability to take curves depends heavily on the deformation of the chassis which, if it is appropriate, makes it possible to lift or relieve the inner rear wheel and therefore to prevent under-steering. The phenomenon of twist undergone by a kart chassis in a turn is called "spin".

In other words, to have enjoyable driving, it is important for the chassis to be sufficiently flexible.

However, the structure of a classic kart is such that many functional elements or accessories are fixedly attached to the chassis or frame. This increases its rigidity and therefore impairs the roadworthiness of the kart.

These elements include the pedal module which classically comprises a brake pedal and an accelerator pedal. These elements also include a steering module, a seat, etc.

There is therefore a need for such a kart structure that comprises a chassis that is more solid and more impact resistant than prior-art chassis. In particular, there is a need for such a kart chassis that is more resistant to side impacts undergone by the kart.

There is therefore a need for a kart structure having all the functional and accessory elements needed for efficient operation of the kart and providing the driver with a high degree of comfort to the driver while preserving the spin capacity of the chassis.

There is also a need for such a kart structure that has high roadworthiness.

3. SUMMARY OF THE INVENTION

The invention meets this requirement by proposing a kart comprising a chassis comprising a pair of tubular rails substantially parallel to each other and extending longitudinally, connected to each other at each of their ends by at least one transverse tubular element.

According to the invention, such a kart chassis comprises, at a front part of said kart, at least two tubes appreciably having a flared-out U shape, facing each other and assembled at their median part so as to form an X-shaped structure inserted between said tubular rails and at least two appreciably rectilinear tubes disposed on either side of said X-shaped structure, one first end of which is fixedly attached to one of said tubular rails and the other end of which is fixedly attached to a central area of said X-shaped structure.

Thus, the invention relies on a wholly novel and inventive approach to the designing of the structure of a kart chassis.

Indeed, the chassis of the invention, in its front part, has an X-shape with a flared-out feature that enables a better absorption of stresses diagonally on the chassis. Thus, in the event of stresses on the side parts of the kart (for example in the event of impact), this novel shape of chassis reduces mechanical strains on the structural elements and the welding areas and contributes to reinforcing the solidity of the chassis.

As compared with the prior art, the use of two tubes with a flared-out U shape, facing each other and assembled on their median part reduces to the minimum the welding areas or the tightening means as well as their being subjected to shear forces, the structural elements and the central area then taking most of the bending and compressive forces. Depending on the orientation of the impacts, the flaring of the X-shape can also involve a partial absorption of torsion forces at the central area, thus preventing a concentration of compressive forces at a central point of the central area.

In addition, since the types of stresses on the kart chassis are numerous and have different orientations, the choice of a tubular section for the structural elements provides for greater resistance to the multi-axial stresses and to the warping as compared with U-shaped sections or rectangular sections.

According to one particular aspect of the invention, the kart comprises a pedal unit module comprising a beam on which there is mounted at least one pedal. Such a beam is fixedly attached to the chassis, on the one hand to the transverse tubular element connecting the tubular rails at the front part of the kart and on the other hand to the central area of the X-shaped structure. The mechanical stresses communicated to the chassis from the pedal module via the structural beam are thus better distributed because of the X shape of the structure of the chassis.

According to another particular aspect of the invention, which can be implemented independently of the particular X-shaped structure of the chassis described here above, or in combination with this particular structure, the structure of such a kart is of the modular type. Thus, one or more interface parts formed by damping elements, or dampers, are disposed between the frame itself and the different functional elements or accessories that are fixedly attached to it.

Indeed, a kart generally consists of a chassis, or frame, to which there are welded or screwed different functional or accessory elements such as the pedal unit, the steering module, the seat, etc. Such functional elements or accessories tend to increase the rigidity of the chassis, thus reducing its aptitude for spin and hence impairing the roadworthiness of the kart.

In particular, such damping elements forming interface parts are disposed at the level of the point or points at which the pedal is attached to the frame.

For example, in the case of an adjustable pedal unit, mounted so as to be sliding on a central beam fixedly attached to the chassis, such dampers can be disposed at each of the ends of the central beam, on either side of this central beam, at the level of the four points at which the beam is attached to the chassis.

A kart generally also comprises a steering module comprising at least one steering wheel and one steering column, such a steering module being fixedly attached to the chassis at one attachment point at least. According to the invention, such a kart also comprises at least one damper forming an interface part between the chassis and the steering module at said at least one attachment point.

Similarly, such a kart can comprise at least one damper forming an interface part between the chassis and a seat at the point or points at which the seat is fixed to the chassis.

Thus, through these dampers, a decoupling is obtained between the stresses of the chassis and the stresses of the different functional elements or accessories. It is thus possible to improve the spin capacity of the chassis by relieving the strains of the accessories or elements that are welded or screwed to it. The roadworthiness of the kart is therefore improved.

In addition, the invention prevents the transfer of stresses from the chassis to the different parts (pedal unit, steering module, seat, etc.) fixedly attached to it.

According to one particular embodiment of the invention, such damping elements forming interface parts between the chassis and the different functional elements or accessories of the kart are Silent-blocks (registered mark).

Indeed, such Silent-block mountings are generally constituted by a flexible material which advantageously absorbs impacts and vibrations between the different functional elements or accessories of the kart and of the chassis which may carry them. Such Silent-blocks can be made out of rubber, plastic or any other material responding to a criterion of elasticity and damping of the impulses that they receive.

Such dampers can thus take the form of elastic hinges comprising an elastomer ring pre-compressed between two cylindrical plates or frames.

According to another characteristic of the invention, the chassis comprises at least one gusset placed between two of the elements and/or tubular rails forming the chassis, in such a way as to assemble them.

Such a gusset, constituted by a part made of swaged sheet metal, thus holds the tubes constituting the frame to each other. Unlike in the prior art, the tubes forming the chassis are no longer directly welded to each other but are assembled by means of a gusset. In case of impact for example, this makes it possible not to transmit the forces directly to the tube and makes the assembly more solid.

According to one particular aspect, such a gusset is welded to each of the elements and/or tubular rails that it assembles.

Thus, in the prior art, the tubes were directly welded to each other: the welding areas were therefore situated precisely at the stress areas and, in the event of shock, were likely to get broken at the junction between the tubes. According to the invention by contrast, the areas for welding the gusset to each of the tubes that it joins together are slightly set off from the stress areas situated at the junction between the tubes. Such welds therefore prove to be more solid and the assembling of the tubular elements of the chassis is therefore more resistant, especially in the event of impact.

According to one particular characteristic of the invention, such a gusset comprises a substantially semi-cylindrical portion surrounding one of the tubular elements that it assembles and at least one reinforcement wing extending between these tubular elements.

Such a gusset can easily be manufactured by swaging sheet metal. The reinforcement wing is for example triangular, making it possible to reinforce the assembling of the tubes. The substantially semi-cylindrical portion can surround the tube on only half of the circumference.

4. LIST OF FIGURES

Other features, characteristics and advantages of the invention shall appear more clearly from the following description given by way of a simple illustratory and non-exhaustive example with reference to figures, of which:

FIG. 1 presents a three-quarter view or view in perspective of a kart according to the invention;

FIG. 2 presents an exploded view of the kart of FIG. 1;

FIG. 3 illustrates the pedal unit module of the kart of FIG. 1 and its assembling with the chassis by means of dampers;

FIG. 4 presents an example of a steering module and its assembling with the chassis by means of dampers;

FIG. 5 presents an example of a kart chassis according to the invention and especially the particular shape of its front part;

5. DETAILED DESCRIPTION OF THE EMBODIMENTS OF THE INVENTION

The general principle of the invention relies on a novel kart chassis structure used to augment resistance to impacts and especially side impacts. Such a structure, formed by tubular elements, has an X shape inserted between the longitudinal rails, as well as transverse tubes leading to a better distribution of the mechanical stresses and therefore a reduction of strains on the tubes and the welding areas.

Referring to the figures, we now present an example of an embodiment of such a kart structure.

Figure 1:
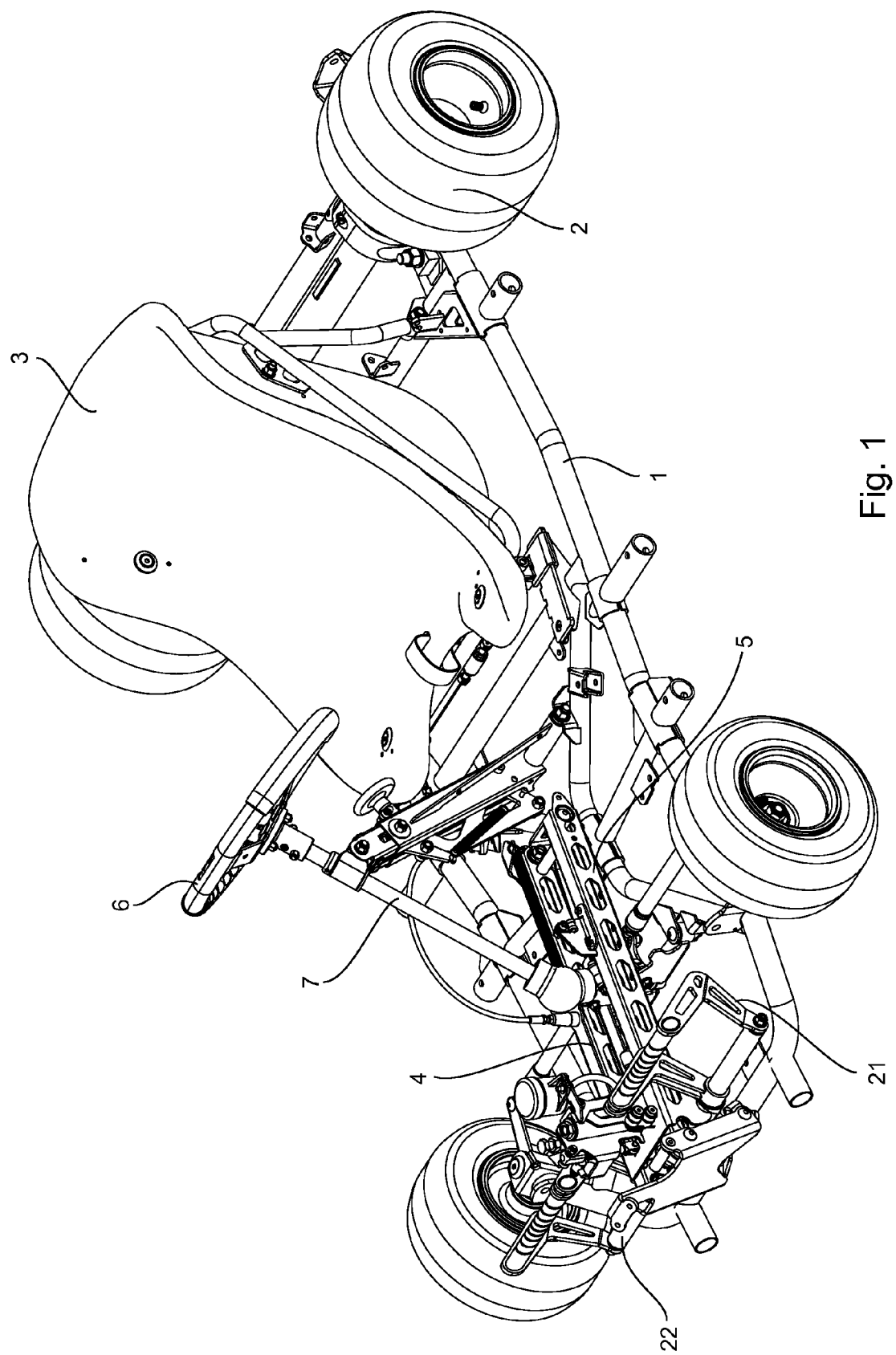

FIG. 1 offers a three-quarter view or perspective view of a kart according to the invention. Such a kart is for example a rental electric kart. It comprises a chassis or frame 1, four wheels 2, a seat 3 in which the driver takes position. A pedal unit 4 carries a brake pedal 21 and an accelerator pedal 22. This pedal unit 4 is mounted so as to be sliding on a central beam 5 which is fixedly attached to the chassis 1. The assembly formed by the pedal unit 4 and the beam 5 forms a pedal module 8. The kart is steered by means of the steering wheel 6 mounted on the steering column 7.

The invention proposes a novel form of chassis for the kart of FIG. 1, as well as a particular mode of assembling these different constituent elements which shall now be illustrated with reference to FIGS. 5 and 6.

Figure 5:
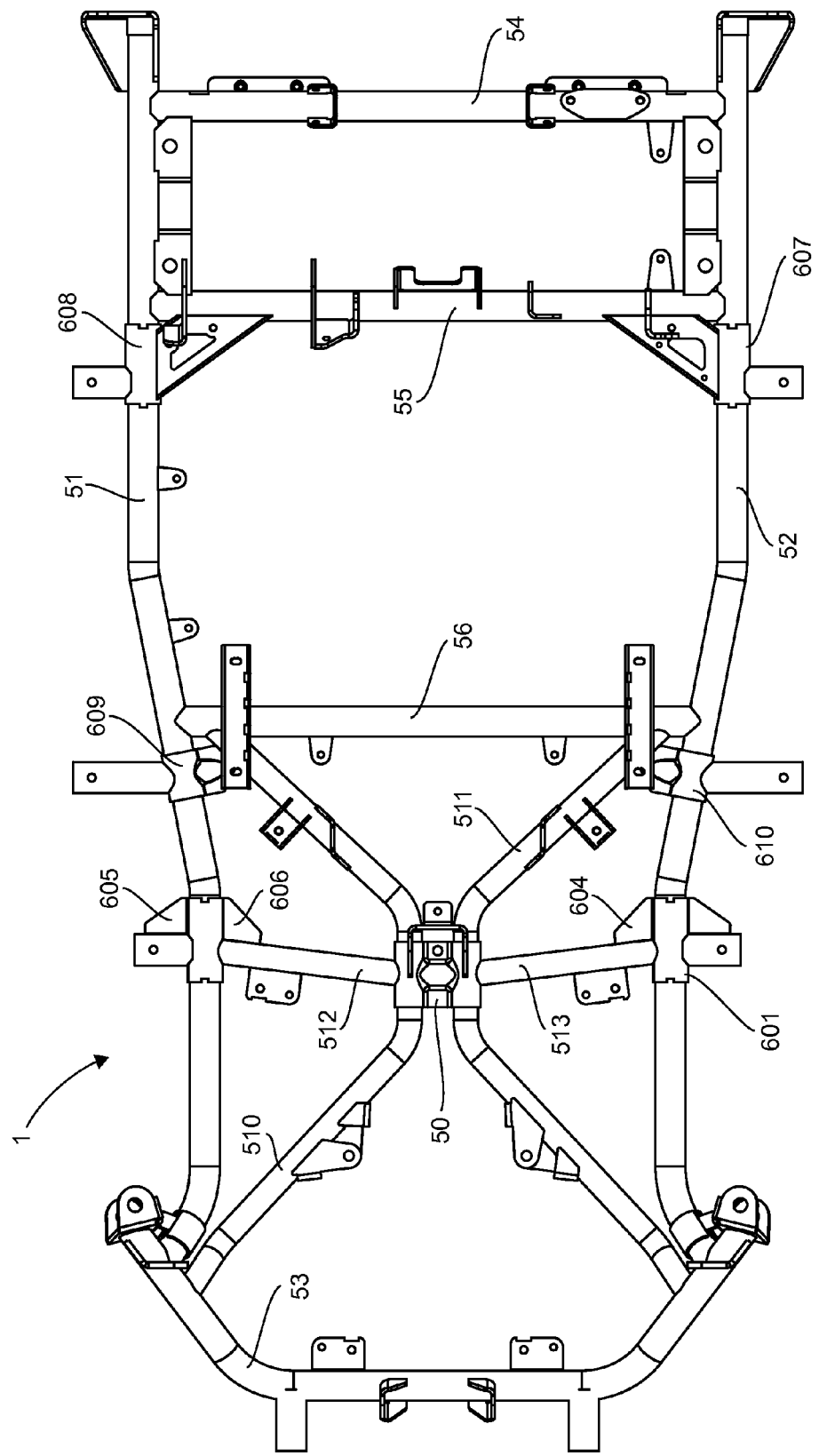
Figure 6:
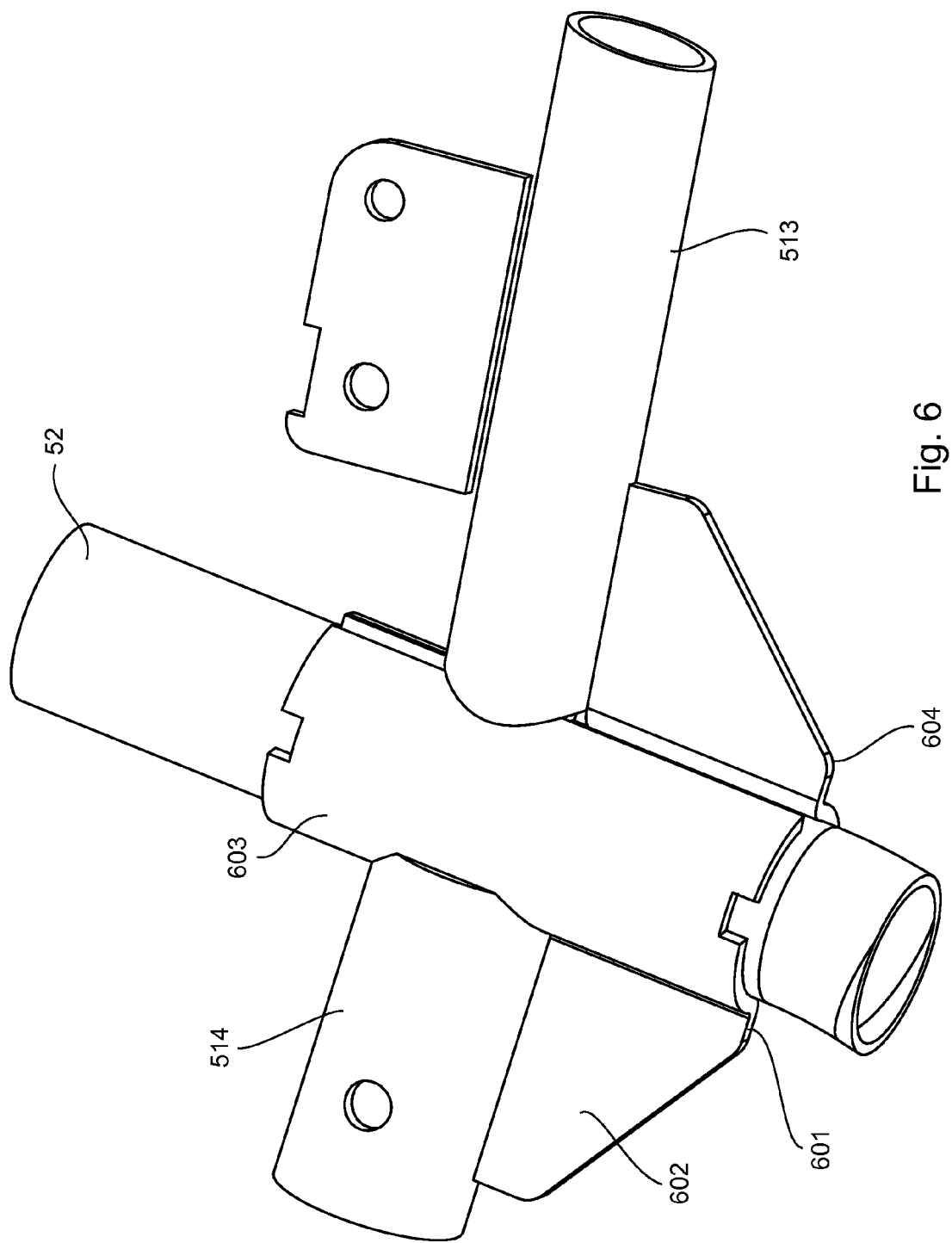
FIG. 6 illustrates the shape of a gusset used in the assembling of the chassis of FIG. 5.

The chassis 1 of FIG. 5 is preferably tubular and made out of a solid and resistant material such as steel, for example chrome-molybdenum steel. It has a pair of tubular rails 51 and 52, appreciably parallel and extending longitudinally, connected to each other at each of their ends by a transverse tubular element: the rails or members 51 and 52 are thus linked at the front end of the kart by an appreciably curved tube 53, and connected to the rear end of the kart by a rectilinear tube 54. The tube 53 situated at the front of the kart is especially intended to bear the front protection elements of the kart.

The spacing between the longitudinal rails 51 and 52 is slightly greater at the rear part of the kart than at the front part.

In the example of FIG. 5, a second rectilinear transverse tube 55 extends between the longitudinal rails 51 and 52, at the rear of the kart, appreciably parallel to the rectilinear tube 54 situated at its rear end.

Similarly, a median rectilinear transversal tube 56 extends between the two longitudinal rails 51 and 52 appreciably at the middle of these rails and hence appreciably at the middle of the chassis 1.

The front part of the chassis 1 included between the front transversal tube 53 and the median transversal tube 56 has a particular shape enabling a better absorption of the diagonal stresses on the chassis.

Indeed, two tubes referenced 510 and 511, having an appreciably flared-out U shape, are placed so as to face each other and are joined together at their median part 50 so as to form an X-shaped structure inserted between the longitudinal tubular rails 51 and 52.

More specifically, one end of the U-shaped tube 510, 511 is fixedly attached to the front transverse tube 53 by its other end, the U-shaped tube 510, 511 is fixedly attached to the median transverse tube 56 and to the longitudinal rail 51, 52.

In addition, two appreciably rectilinear reinforcement tubes 512 and 513 are placed on either side of the X-shaped structure formed by the two U-shaped tubes 510 and 511. Thus, a first end of the reinforcement tube 512 is fixedly attached to the right longitudinal rail 51 and a second end of the reinforcement tube 512 is fixedly attached to the central area 50 of the X-shaped structure. Similarly, a first end of the reinforcement tube 513 is fixedly attached to the left longitudinal rail 52 and a second end of the reinforcement tube 513 is fixedly attached to the central area 50 of the X-shaped structure.

Thus, the two U-shaped tubes 510 and 511 associated with the two reinforcement tubes, namely the right tube 512 and the left tube 513 respectively form a six-armed chassis structure which proves to be more resistant and more solid in the event of major stresses (for example an impact) on the side parts of the kart.

In addition, the solidity of the chassis according to the invention is further increased by a special assembling of the different tubes or tubular elements which can be implemented for any type of kart chassis including for a chassis which does not show the particular shape of FIG. 5 on its front part.

Indeed, according to the prior art, the different tubes constituting the chassis are directly welded to one another. According to the invention, by contrast, certain tubes of the chassis are not directly welded to one another but assembled by means of intermediate parts called gussets represented in FIG. 6.

The gusset 601 is a part made out of swaged sheet metal, for example steel, comprising a semi-cylindrical portion 603 and a substantially triangular reinforcement wing 602. In the example of FIG. 6, the gusset 601 is used for the assembling of the longitudinal rail 52 and of the two transversal tubes referenced 513 and 514. The gusset 601 is placed at the intersection of these different tubes so that the appreciably semi-cylindrical portion 603 caps the upper part of the longitudinal rail 52 at the junction of the tubes and so that the reinforcement wing 602 extends between the longitudinal rail 52 and the transverse tube 514.

A second gusset 604, appreciably symmetrical to the first gusset 601, is positioned so that its semi-cylindrical portion surrounds the lower part of the longitudinal rail 52 at the junction of the tubes and so that its reinforcement wing extends between the longitudinal rail 52 and the transverse reinforcement tube 513.

Each of these two gussets 601 and 604 is joined by welding to the longitudinal rail 52, the transverse reinforcement tube 513 and the transverse tube referenced 514. Thus, these welds are not directly positioned on the stress areas situated at the junction between the tubes, but offset to a proximate position, making them more resistant in the event of major stress on the tube, for example in the event of an impact suffered by the kart. In case of stress, the presence of such gussets makes it possible for this stress not to be directly transmitted from one tube to another, making the assembly of the different constituent tubes of the chassis more solid.

The reinforcement wings of these gussets increase the rigidity of the assembling of the tubes and prevent the deformation of the relative position of the two tubes between which they extend, in keeping their spacing substantially constant.

Other gussets referenced 605 to 610 are also illustrated in FIG. 5 and enable the assembling of the different tubes constituting the chassis of the kart. Their structure is close to that of the gussets 601 and 604 of FIG. 6, namely with a substantially semi-cylindrical portion and a reinforcement wing. However, the shape and dimensions of the reinforcement wing can vary according to the relative position of the tubes to be assembled and the stresses to which they are subjected. Such gussets are also placed at the central area 50 of the X-shaped structure of the front part of the chassis.

Figure 2:
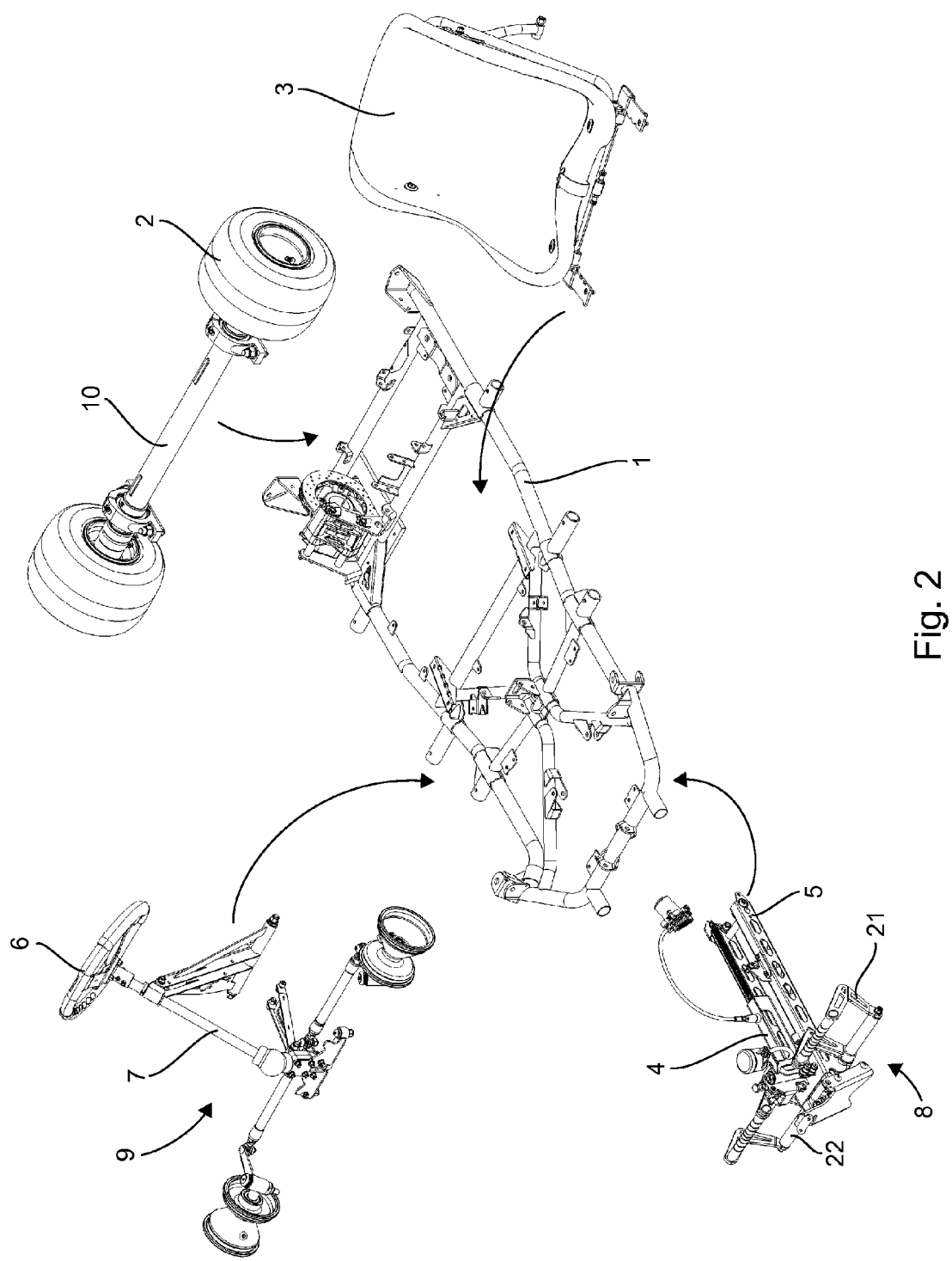
Figure 3:
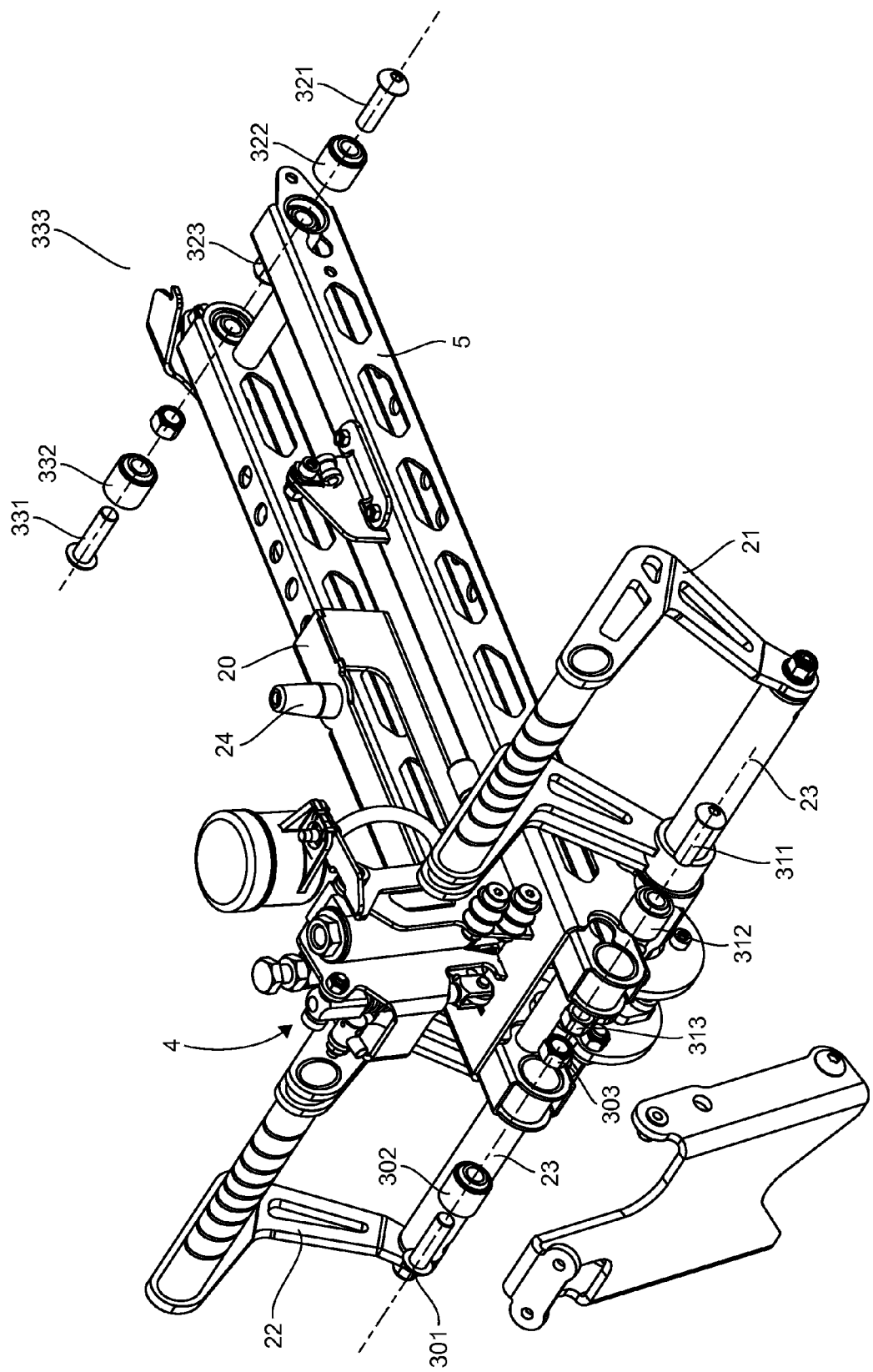
Figure 4:
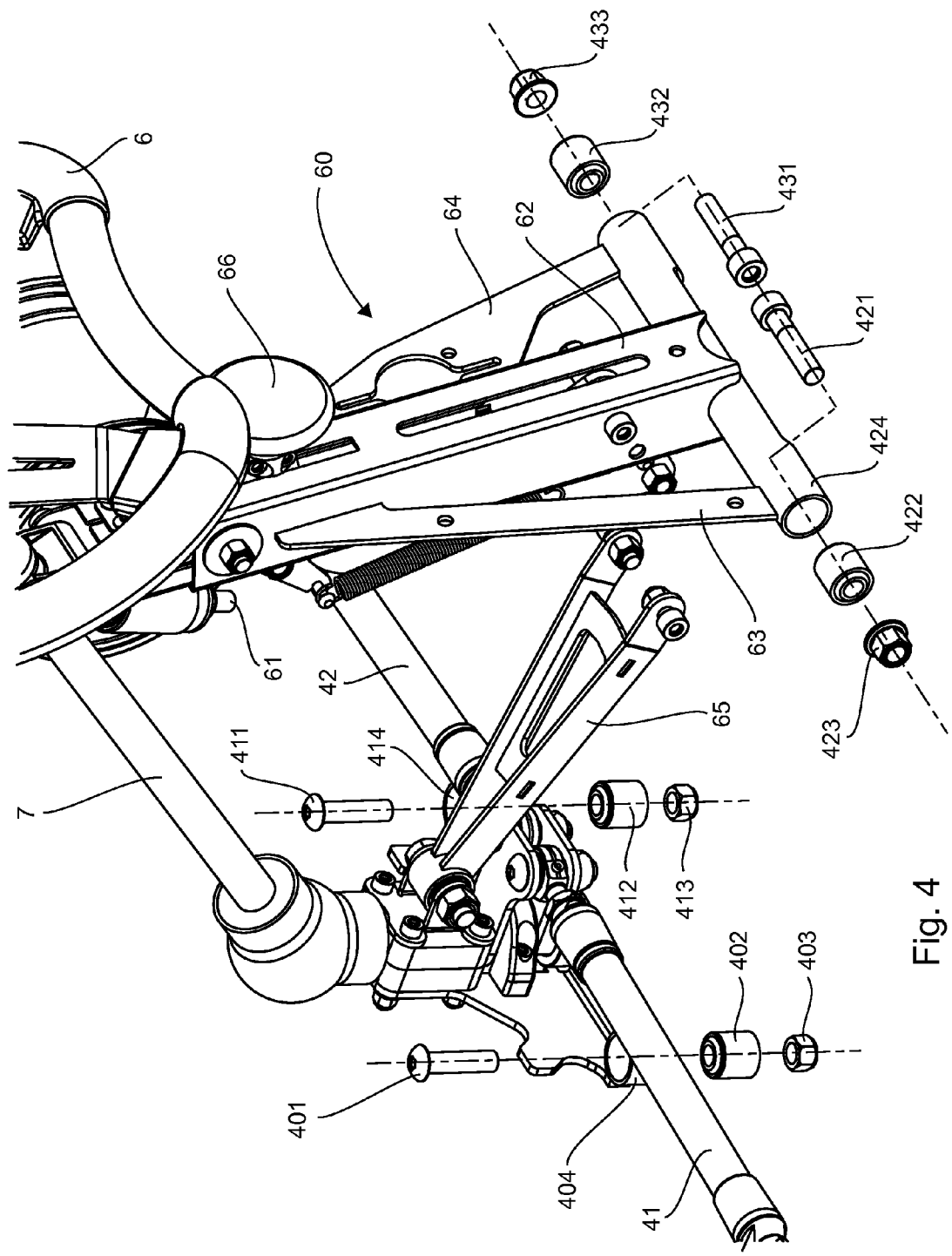

Referring now to FIGS. 2 to 4, we present another aspect of the invention in which the kart has a modular structure. This aspect can advantageously be combined with the principle described here above in which the kart has, at its front part, a chassis having a special X-shaped structure. It can also be implemented independently of this principle in a kart having another chassis structure. As illustrated in FIG. 2, such a kart therefore has a modular structure in which the chassis 1 is assembled with the different functional elements or accessories by means of interface parts taking the form of dampers used to decouple the stresses of the chassis from the stresses of these different assembled elements.

In FIG. 2, such elements or accessories comprise:
the pedal unit module 8;
the steering module 9;
the seat 3;
the rear end 10.

According to the invention, the use of Silent-block type damping elements in the assembling of these accessories with the chassis reduces the impact of these accessories on the rigidity of the chassis and therefore on its spin capacity. The chassis thus keeps all freedom of deformation.

According to one embodiment of the invention illustrated in FIG. 3, such interface parts are available between the chassis 1 and the pedal unit 8.

In the particular example of FIG. 3, the pedal module 8 comprises a pedal system 4 constituted by a base 20 which slides on a central beam 5. The base 20 of the pedal unit also serves as a base for foot supports 23 intended to support the driver's heels. Each pedal 21, 22 therefore has a foot rest 23 and an upper bar or portion on which the front end of the driver's foot rests. In operation, the upper bar of the pedal pivots about the axis of the foot support 23. Other shapes of pedals, for example solid pedals or pedals with upper flat portions are of course possible.

A set of perforations is made in the upper part of the beam 5 which defines an equivalent number of discrete positions of the pedal unit relative to the seat. The pedal unit is locked into one of these positions by means of a pin 24 which gets engaged in one of the perforations of the beam.

This is of course only an example of a pedal module and any other type of pedal unit can also be implemented in the context of the invention, especially a pedal unit that is not adjustable for example.

The central beam 5 is fixedly attached to the frame 1 at four attachment points by a screw-and-nut system. These four attachment points are situated on either side of the beam, two attachment points being situated at the front end of the beam 5 and two attachment points being situated at the rear end of this beam 5.

Thus, at the front end of the beam 5, two screws 301 and 311 cooperate with two nuts 303 and 313 to fixedly attach the beam 5 and the chassis 1 (not shown). According to the invention, two Silent-block type dampers 302 and 312, made for example of rubber or elastomer, are inserted respectively between the screws 301, 311 and the nuts 303, 313.

Similarly, on the rear part of the beam 5, two screws 321 and 331 cooperate with two nuts 323 and 333 to fixedly join the beam 5 and the chassis 1 (not shown). According to the invention, two Silent-block type dampers 322 and 332, made for example of rubber or elastomer material, are inserted respectively between the screws 321, 331 and the nuts 323, 333.

Other modes of attaching the beam 5 to the chassis 1 can of course be envisaged, provided that the interface parts 302, 312, 322, 332 are inserted between the chassis and the beam during the assembling in order to decouple the work of the chassis from the work of the pedal module and prevent the transfer of stresses from the chassis to the pedal module.

According to one embodiment illustrated in FIG. 4, such interface parts are disposed between the chassis 1 and the steering module 9. The embodiment of FIG. 4 can of course be combined with the embodiment of FIG. 3 so that Silent-block mountings are disposed between the chassis on the one hand and the steering module and the pedal module on the other hand. As an alternative, it can be envisaged to implement the embodiment of FIG. 4 without implementing that of FIG. 3.

FIG. 4 illustrates an example of a steering module 9 capable of being fixedly attached to the chassis 1 in the context of the invention. As described here below, such a steering module enables the height-wise adjustment of the steering column 7. Any other type of steering module can also be used in the context of the invention, especially a steering module that is not adjustable.

Such a steering module 9 comprises a steering wheel 6 at the end of a steering shaft 7 also called a steering column. The steering column 7 transmits the rotational motion of the steering wheel 6 to the wheels by means of rods 41, 42.

In this example, the steering column 7 is connected to the chassis 1 (not shown) by means of a connecting rod 60 of variable length. This rod comprises a slide 61 fixedly attached to the steering column 7 by a pivot link and a slide-way or mast 62 fixedly attached to the chassis 1 by a pivot link.

Lateral reinforcement pieces 63, 64 can be disposed on either side of the slide-way 62 so as to form a triangular structure and are also mounted so as to be pivoting relative to the chassis 1.

An anti-torque part 65, that is substantially triangular, can be disposed between the base of the steering column 7 and the foot of the mast 62 in order to lengthen the steering column and prevent any forward/rearward tilting of this steering column.

In this example, it is possible to adjust the height of the steering column 7 and therefore of the steering wheel 6 by simple sliding of the slide 61 in the slide-way 62 by means of a control button 66 enabling the locking or unlocking of the sliding motion of the slide 61 in the slide-way 62. The detailed mode of operation of this mechanism shall not be described in greater detail here below.

Such a steering module 9 is fixedly attached to the frame 1 (not shown) through assembling by screws and nuts. Four points for the fixed attachment of the steering module to the frame are planned, namely two attachment points situated on the front part of the steering module, appreciably at the base of the steering column 7 on either side of this column, and two attachment points situated at the foot of the slide-way 62 and the side reinforcement pieces 63 and 64.

Thus, at the front part of the steering module 9, two screws 401 and 411 are inserted into two housings 404 and 414 made in the steering module on either side of the steering column 7 and cooperating with two nuts 403 and 413, a portion of a frame 1 (not shown) being thus blocked between the nut 403, 413 and the screw 401, 411 in the tightening position. According to the invention, a Silent-block type damper is also inserted between the nut 403, 413 and the screw 401, 411. This Silent-block type damper 402, 412 is made out of a material with elastic properties. Such Silent-block units 402, 412 get inserted for example in the housings 404, 414 made in the steering module 9.

Similarly, appreciably at the foot of the slide-way 62, two screws 421 and 431 get housed in the tube 424 to which side reinforcement pieces 63 and 64 are fixed. These two screws 421 and 431 cooperate with nuts 423 and 433. Fastening lugs made on the chassis 1 (not shown) are blocked between the screws 421, 431 and the nuts 423, 433 in tightened position so as to fixedly attach the rear part of the steering module 9 to the chassis 1. According to the invention, between the nuts 423, 433 and the screws 421, 431, Silent-block type dampers 422, 432 are also inserted so as to decouple the work of the chassis from the work of the steering module. These Silent-block damping elements 422, 432 can be housed in the tube 424.

Other principles for attaching the steering module to the chassis can also be envisaged without departing from the framework of the invention provided that damper type interface parts are inserted between the chassis and the steering module in this embodiment.

Figure 7:
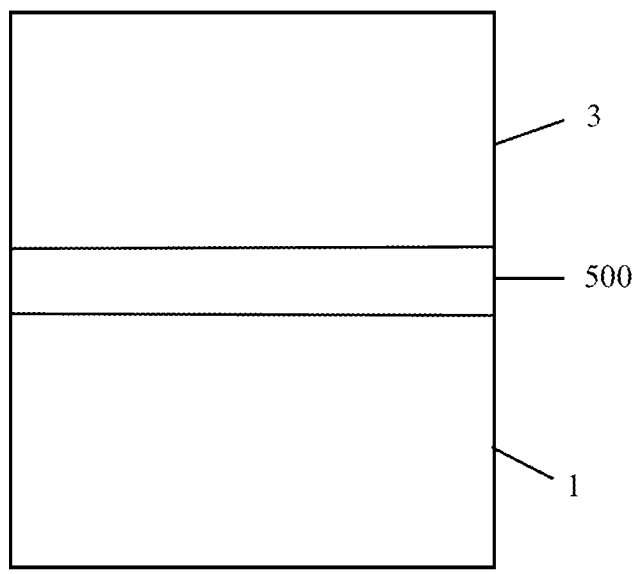
FIG. 7 is a block diagram illustrating a damping element forming an interface part between the chassis and a seat at an attachment point.

The examples of FIGS. 3 and 4 illustrate the principle of the invention according to which the chassis is released from the strains imposed by the different elements that are attached to it so as to preserve its spin capacity. This is done by designing a modular kart structure by insertion of damping elements at the points where these elements are fixedly attached to the chassis. Although this principle has been illustrated only for the pedal unit module (FIG. 3) and for the steering module (FIG. 4), it can also be implemented for the attachment of other elements to the chassis, especially for example for the seat. FIG. 7 is a block diagram illustrating a damping element 500 forming an interface part between the chassis 1 and a seat 3.

The invention claimed is:

1. A kart comprising:
    a front part; and
    a chassis comprising:
        a pair of tubular rails substantially parallel to each other and extending longitudinally, connected to each other at each of their ends by at least one transverse tubular element,
        at the front part of said kart, at least two tubes appreciably having a flared-out U shape, facing each other and assembled at their median part so as to form an X-shaped structure inserted between said tubular rails; and
        at least two appreciably rectilinear tubes disposed on either side of said X-shaped structure, one first end of which is fixedly attached to one of said tubular rails and the other end of which is fixedly attached to a central area of said X-shaped structure.

2. The kart according to claim 1, comprising a pedal unit module comprising a beam on which there is mounted at least one pedal, wherein said beam is fixedly attached to said chassis, on the one hand to said transverse tubular element connecting said tubular rails at said front part of the kart and on the other hand to said central area of said X-shaped structure.

3. The kart according to claim 2, wherein the kart comprises at least one damping element forming an interface part between said chassis and said beam at one point at least of attachment of said beam to said chassis.

4. The kart according to claim 3, wherein said at least one damping element is a Silent-block.

5. The kart according claim 1, also comprising a steering module comprising at least one steering wheel and one steering column, said steering module being fixedly attached to said chassis at one attachment point at least, and at least one damping element forming an interface part between said chassis and said steering module at said at least one attachment point.

6. The kart according to claim 1, also comprising a seat fixedly attached to said chassis at one attachment point at least, and at least one damping element forming an interface part between said chassis and said seat at said at least one attachment point.

7. The kart according to claim 1, wherein said chassis comprises at least one gusset placed between two of said tubular elements and/or tubular rails forming the chassis, in such a way as to assemble them.

8. The kart according to claim 7, wherein said gusset is welded to each of said tubular elements and/or rails that the gusset assembles.

9. The kart according to claim 7, wherein said gusset comprises a substantially semi-cylindrical portion surrounding one of said tubular elements and/or tubular rails that the gusset assembles and at least one reinforcement wing extending between said tubular elements and/or tubular rails.

10. A chassis for a kart, the chassis comprising:
    a pair of tubular rails substantially parallel to each other and extending longitudinally, connected to each other at each of their ends by at least one transverse tubular element;
    at a front part of said kart, at least two tubes appreciably having a substantially flared-out U shape, facing each other and assembled at their median part so as to form an X-shaped structure inserted between said tubular rails; and
    at least two appreciably rectilinear tubes disposed on either side of said X-shaped structure, one first end of which is fixedly attached to one of said tubular rails and the other end of which is fixedly attached to a central area of said X-shaped structure.

* * * * *